(12) United States Patent
Raszga et al.

(10) Patent No.: US 9,518,655 B2
(45) Date of Patent: Dec. 13, 2016

(54) CONTINUOUSLY ADJUSTABLE CONTROL MANAGEMENT FOR A HYDRAULIC TRACK SYSTEM

(71) Applicant: Deere & Company, Moline, IL (US)

(72) Inventors: Calin Raszga, Dubuque, IA (US); Matthew J. Ramler, Luxemburg, IA (US); Bryon P. Neumann, Brantford (CA)

(73) Assignee: DEERE & COMPANY, Moline, IL (US)

( * ) Notice: Subject to any disclaimer, the term of this patent is extended or adjusted under 35 U.S.C. 154(b) by 684 days.

(21) Appl. No.: 13/752,752

(22) Filed: Jan. 29, 2013

(65) Prior Publication Data
US 2014/0208934 A1 Jul. 31, 2014

(51) Int. Cl.
| | | |
|---|---|---|
| *F15B 13/044* | (2006.01) | |
| *F16H 61/421* | (2010.01) | |
| *A01G 23/00* | (2006.01) | |
| *F15B 11/16* | (2006.01) | |
| *E02F 9/22* | (2006.01) | |

(52) U.S. Cl.
CPC ............ *F16H 61/421* (2013.01); *A01G 23/00* (2013.01); *E02F 9/2253* (2013.01); *F15B 11/166* (2013.01); *F15B 11/167* (2013.01)

(58) Field of Classification Search
CPC ...... F16H 61/421; F15B 11/166; F15B 11/167
See application file for complete search history.

(56) References Cited

U.S. PATENT DOCUMENTS

| | | | | |
|---|---|---|---|---|
| 4,396,087 A | * | 8/1983 | Rock et al. | 180/243 |
| 4,399,886 A | * | 8/1983 | Pollman | 180/197 |
| 4,884,402 A | * | 12/1989 | Strenzke et al. | 60/426 |
| 4,967,557 A | | 11/1990 | Izumi et al. | |
| 5,177,964 A | * | 1/1993 | Tanaka et al. | 60/445 |
| 5,191,950 A | * | 3/1993 | Kleineisel et al. | 180/6.3 |
| 5,291,676 A | * | 3/1994 | Beater et al. | 60/422 |
| 5,447,029 A | * | 9/1995 | Swick et al. | 60/492 |
| 6,339,917 B1 | * | 1/2002 | Dillon et al. | 56/14.6 |

(Continued)

FOREIGN PATENT DOCUMENTS

CN 101871477 A * 10/2010 ............. F15B 13/02

OTHER PUBLICATIONS

Australian Government Patent Examination Report No. 1 for Patent Application No. 2013203133; Australia IP; Dated Oct. 1, 2014; pp. 1-8.

*Primary Examiner* — Thomas E Lazo
*Assistant Examiner* — Daniel Collins
(74) *Attorney, Agent, or Firm* — Taft Stettinius & Hollister LLP (57) ABSTRACT

The present disclosure provides a control system of a powered machine. The control system includes a hydraulic motor configured to drive a track system of the machine. The motor is operable with a variable displacement. A control valve is fluidly coupled to the motor. In addition, the control system includes a controller and an electro-hydraulic valve disposed in electrical communication with the controller and fluid communication with the control valve. The electro-hydraulic valve receives a signal from the controller, and based on the signal, the electro-hydraulic valve hydraulically varies the start of control pressure of the motor.

20 Claims, 5 Drawing Sheets

(56) References Cited

U.S. PATENT DOCUMENTS

| | | |
|---|---|---|
| 6,648,091 B2 * | 11/2003 | Tanabe .......................... 180/197 |
| 8,479,861 B2 * | 7/2013 | Haruyama et al. ............ 180/197 |
| 8,480,378 B2 | 7/2013 | Krimbacher |
| 2007/0199439 A1 | 8/2007 | Stephens et al. |
| 2010/0154404 A1 | 6/2010 | Bitter |
| 2011/0094214 A1 | 4/2011 | Nelson et al. |

* cited by examiner

CONTINUOUSLY ADJUSTABLE CONTROL MANAGEMENT FOR A HYDRAULIC TRACK SYSTEM

FIELD OF THE DISCLOSURE

The present disclosure relates to a control system of a variable displacement hydraulic motor, and in particular, to the control management system of a track system on a machine.

BACKGROUND OF THE DISCLOSURE

Work machines, such as those in the forestry industry, are often required to balance the amount of power distributed to various performance characteristics and operations. For instance, a machine may include a boom and work implement to complete a desired task. The amount of power produced by the engine is shared throughout the machine to move the machine along different terrain and also operate the boom and work implement. In some instances, it is desirable for the machine to travel at a high speed, whereas in other instances the machine may be stationary and work is being done by the boom and work implement. In any event, it is desirable to optimize machine performance.

Some machines utilize one or more hydraulic motors to provide torque to drive the machine forward and backward. The machine can include an engine that produces power and drives a hydraulic pump. The pump can provide hydraulic fluid to the one or more hydraulic motors through a control valve. Each hydraulic motor can be a variable displacement motor, such that at a minimum displacement the machine can move at a high speed and at a maximum displacement the machine travels at a lower speed. At a maximum displacement, however, a greater amount of torque can be provided to drive the machine over difficult terrain, an inclined slope, etc. The manner in which motor displacement is controlled on a variable displacement hydraulic motor is through a predefined "start of control" pressure (SOC) that is mechanically fixed and it is difficult to make any adjustments to the displacement setting. The "start of control" pressure is a defined pressure at which the motor displacement begins to increase due to an increased load on the motor. The lack of adjustability prevents the machine from performing at optimal levels of performance in nearly every possible scenario.

A need therefore exists to provide a means for adjustably controlling the "start of control" pressure of the motor to better optimize machine performance. Moreover, it is desired to be able to make these adjustments continuously and as a function of how a machine operator is controlling the machine in real-time.

SUMMARY

In an exemplary embodiment of the present disclosure, a control system is provided for a powered machine. The machine includes an engine for producing power and a track system for moving along a surface. The control system includes a hydraulic motor configured to drive the track system, where the motor is operable with a variable displacement. The control system also includes a control valve fluidly coupled to the motor, a controller, and an electro-hydraulic valve disposed in electrical communication with the controller and fluid communication with the control valve. The electro-hydraulic valve receives a signal from the controller, and based on the signal, the electro-hydraulic valve hydraulically varies the SOC pressure with an external fluid source.

In one aspect of this embodiment, the electro-hydraulic valve is fluidly coupled to a fluid source. In another aspect, the controller electrically urges the electro-hydraulic valve from a closed position to at least a partially open position. In a different aspect, the fluid source is fluidly coupled to the control valve when the electro-hydraulic valve is disposed in at least the partially open position. In a further aspect, the electro-hydraulic valve is biased in a closed position. In an alternative aspect, the control system includes a spring for biasing the control valve to a first position, where in the first position the control valve fluidly controls the motor to minimum displacement.

In yet a further aspect of this embodiment, the motor is configured to receive a load from the track system, and based on the load, the motor sends a load pressure signal to the control valve that at least partially compresses the spring. Moreover, the electro-hydraulic valve sends an override fluid signal to the control valve, where the fluid signal and load pressure signal hydraulically applies a pressure force against the control valve to vary the displacement of the motor. In another aspect, the control system can include a motor actuator fluidly coupled to the control valve, where a movement of the control valve induces a corresponding movement of the motor actuator to vary the motor displacement.

In another embodiment of the present disclosure, a method is provided for varying the start of control pressure of a variable displacement hydraulic motor adapted to drive a track system of a machine. The machine includes user controls for controlling the functionality of the machine, a controller in electrical communication with the user controls, a control valve biased in a first position by a spring having a fixed spring force, and a proportional electro-hydraulic valve electrically coupled to the controller and fluidly coupled to the control valve. The method includes sending an electrical signal to the electro-hydraulic valve, moving the electro-hydraulic valve from a substantially closed position to at least a partially open position, fluidly coupling the electro-hydraulic valve and control valve to one another, controllably moving the control valve from the first position to a second position, and varying the start of control pressure of the motor.

In one aspect of this embodiment, the varying step comprises fluidly controlling a motor actuator. In another aspect, the method includes receiving an input from the user controls, the input being related to a desired function of the machine, and operably controlling the control valve based on the input. In a different aspect, the controllably moving step comprises applying a hydraulic force to the control valve, the hydraulic force including a fluid pressure from the electro-hydraulic valve and a load pressure from the motor, compressing the spring, and moving the control valve to induce a change in motor displacement. In an alternative aspect, the method includes providing the motor with a fixed setting for controlling motor displacement and a plurality of displacement profiles, each of the displacement profiles being a function of load on the motor and machine speed, controlling the motor according to one of the plurality of displacement profiles, sending a signal to override the fixed setting of the motor, and variably adjusting the motor to operate according to a second of the plurality of displacement profiles.

In a different embodiment of the present disclosure, a method is provided for varying a start of control pressure of a variable displacement hydraulic motor for driving a machine. The machine includes operator controls for controlling the operation of the machine, a controller in electrical communication with the operator controls, a control valve biased in a first position and disposed in fluid communication with the motor, and an electro-hydraulic valve electrically coupled to the controller and fluidly coupled to the control valve. The method includes receiving an input signal from the operator controls, where the input signal corresponds to a desired machine operation. An electrical signal is sent to the electro-hydraulic valve based on the input signal. The method also includes fluidly coupling the electro-hydraulic valve and control valve to one another, controllably moving the control valve from the first position to a second position based on the electrical signal, and varying the start of control pressure of the motor in accordance with the desired machine operation.

In one aspect of this embodiment, the method includes increasing the start of control pressure in accordance with an input signal corresponding to a desired increase in machine speed. In another aspect, the method includes decreasing the start of control pressure in accordance with an input signal corresponding to a desired increase in machine multi-functionality. In a different aspect, the method includes varying the start of control pressure from a first pressure to a second pressure and controlling the machine at a maximum speed and the motor at a minimum displacement. Here, the first pressure is less than the second pressure.

In a further aspect, the method includes providing the motor with a plurality of displacement profiles, where the plurality of displacement profiles includes a first displacement profile having a first start of control pressure and a second displacement profile having a second start of control pressure, the first start of control pressure corresponding to a first machine performance profile and the second start of control pressure corresponding to a second machine performance profile. This aspect also includes receiving the input signal from the operator controls to adjust machine performance to correspond to either the first machine performance or the second machine performance and varying the start of control pressure to the first start of control pressure or the second start of control pressure. In a related aspect, the method includes varying the start of control pressure to the first start of control pressure to achieve greater machine functionality or to the second start of control pressure to achieve greater machine speed as load pressure on the motor increases, wherein the first start of control pressure is less than the second start of control pressure.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
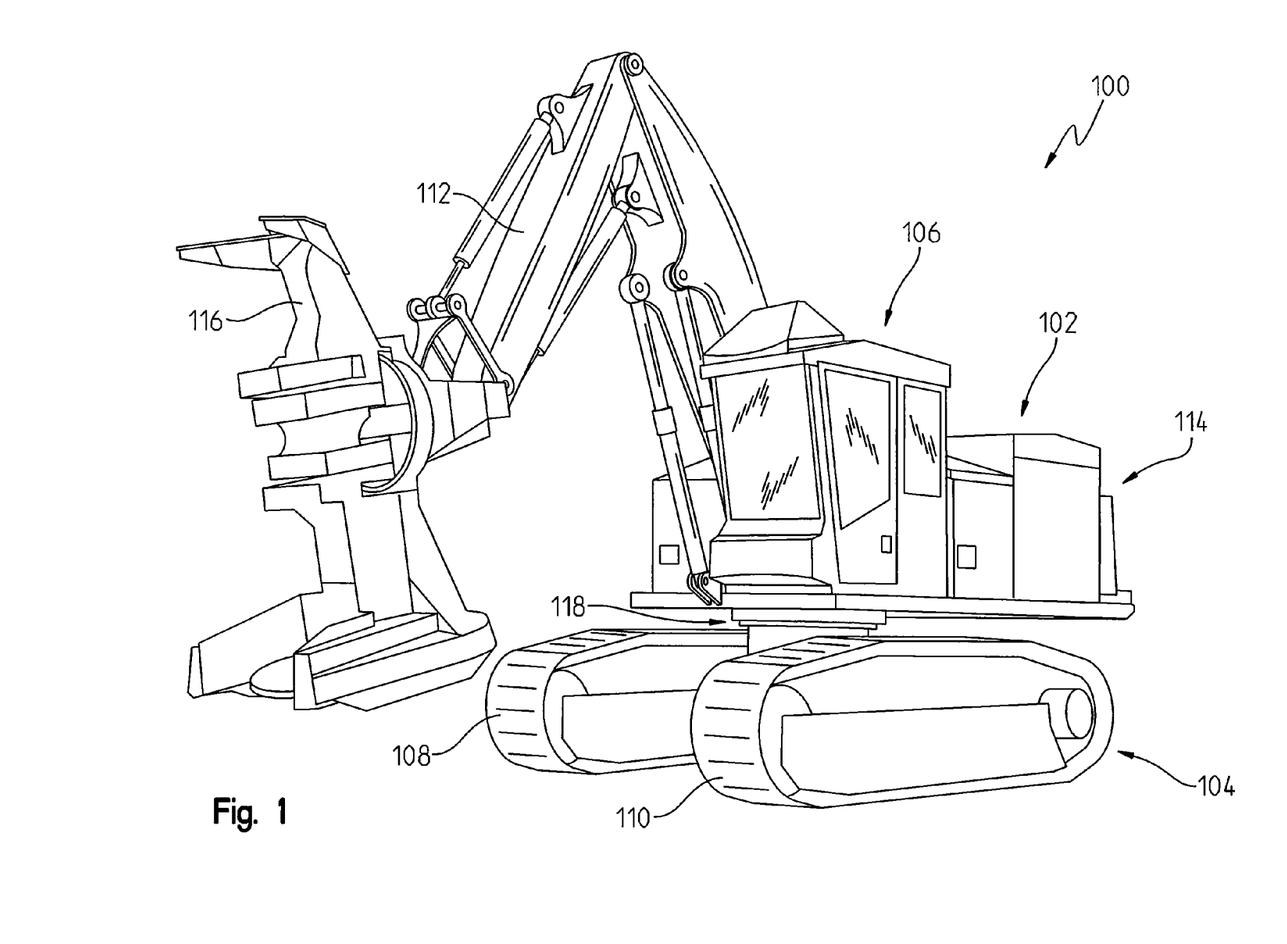
FIG. 1 is a side perspective view of a tracked feller buncher.

Referring to FIG. 1, an exemplary embodiment of a machine, such as a feller buncher 100, is shown. The machine 100 can include an upper frame assembly 102 which is supported by an undercarriage assembly 104. A boom assembly 112 has a first end which is pivotally coupled to the upper frame assembly 102 and a second end which has a work implement secured thereto such as a cutting head 116 for sawing and bunching trees. The upper frame assembly 102 can include a cab 106 in which an operator utilizes a plurality of controls (e.g., joysticks, pedals, buttons, screens, etc.) for controlling the machine 100 during operation thereof. The upper frame assembly 102 can also include an engine compartment 114 that houses an engine such as a diesel engine which provides the motive power for operating the components associated with the machine 100. Both the cab 106 and the engine compartment 114 can be supported by various frame members that form the upper frame assembly 102.

The undercarriage assembly 104 can include a first track 108 and a second track 110 that engage and move along the ground during operation. The first track 108 and second track 110 can be driven by a drive sprocket (not shown) and a front idler wheel (not shown) about which a track chain (not shown) is entrained. As will be described, a hydraulic motor can operably drive the drive sprocket (which may form part of a high reduction gearset) so as to drive the track chain (not shown) thereby providing motive power for moving the machine 100.

The upper frame assembly 102 can be mechanically coupled to the undercarriage assembly 104 by a tilt mechanism and turntable assembly 118. The tilt mechanism and turntable assembly 118 can operably control the machine 100 to be rotated and tilted about one or more axes.

Figure 2:
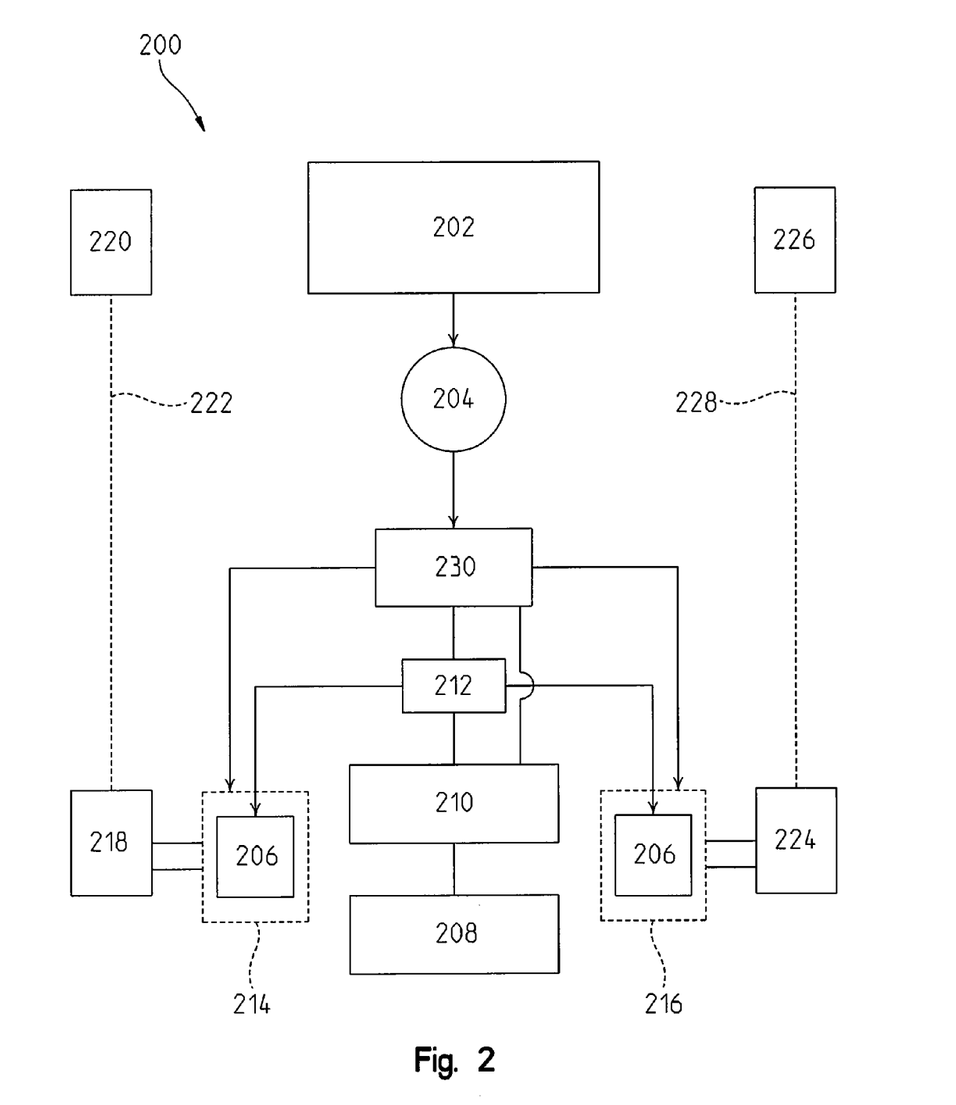
FIG. 2 is a control schematic for a work machine.

With reference to FIG. 2, an embodiment of a control scheme for a tracked machine 200 (e.g., a feller buncher or harvester) is shown. The machine 200 includes an engine 202 that can be hydraulically coupled to a hydraulic pump 204. The hydraulic pump 204 can deliver fluid to a main valve 230 for hydraulically controlling different machine elements. The machine 200 also includes both a first side and a second side. On the first side, the machine 200 can include a first hydraulic drive motor 214 that is operably coupled to a high-reduction planetary gearbox 218. The gearbox 218 may include a drive sprocket (not shown) or similar mechanism that is coupled to a chain 222 or belt for rotatably driving an idler wheel or disc 220. The chain 222 can be operably coupled to a track upon which the machine can move forward and backward.

Similarly, on the second or opposite side, the machine 200 can include a second hydraulic drive motor 216 that is operably coupled to a high-reduction planetary gearbox 224. The gearbox 224 may include a drive sprocket (not shown) or similar mechanism that is coupled to a chain 228 or belt for rotatably driving an idler wheel or disc 226. In conjunction with the first hydraulic drive motor 214, the second hydraulic drive motor 216 can move the machine 200 in a forward or reverse direction.

In FIG. 2, the drive motors 214, 216 can be supplied with hydraulic fluid from the hydraulic pump 204 via the main valve 230. The main valve 230 can include different channels or flow paths for directing fluid to both drive motors. Moreover, the main valve 230 can direct fluid to one or more hydraulic cylinders (not shown) for operating a boom assembly, work implement, swing the upper frame assembly 102 relative to the undercarriage assembly 104 (FIG. 1), and perform other functions of the machine. In other words, hydraulic fluid supplied by the hydraulic pump 204 can be distributed throughout the machine for performing the different functions of the machine.

As also shown in FIG. 2, the machine 200 can include operator controls 208 for operating the machine 200. An operator can maneuver a joystick, press a pedal, push a button, or utilize other controls for achieving desired functionality of the machine 200. In doing so, the operator controls 208 can be in electrical communication or coupled to a machine controller 210. The machine controller 210 can operably control the functionality of the machine 200. For instance, different software algorithms or programs can be downloaded to and readable by the controller 210 for controlling the machine 200. Some of the steps taken by the controller 210 to control the machine 200 may be as a result of different inputs by the machine operator to the operator controls 208, which in turn provides a signal to the controller 210. The controller 210 can interpret the type of control being made by the operator, and different actions can be taken by the controller 210 as a result of this control. As will be described in further detail, an electro-hydraulic valve 212 can be disposed in communication with the controller 210 and further in hydraulic communication with the hydraulic motors 214, 216.

The drive motors in FIG. 2 can be a variable displacement hydraulic motor, such that variable speeds can be achieved based on a given amount of flow. The motor displacement can be controlled between a minimum or low displacement and a maximum or high displacement. The minimum displacement of the motor can correspond to an actual minimum motor displacement or to a desired displacement value mechanically set by an operator, for example. At minimum displacement, the motor can operate so that the machine achieves maximum or high speed. On the other hand, at maximum displacement, greater torque can be achieved but at a lower machine speed. In one method of operation, the motor control can be set to maintain the motor at or near minimum displacement so that the machine can operate at a higher speed. This, however, can change as the machine encounters difficult terrain, contacts a tree stump, ascends an elevation or other similar event that causes a load pressure induced on the motor to increase. This increased load pressure is a function of an increased load applied to the tracks of the machine. As the load pressure increases, a threshold or predetermined load pressure, or a "start of control" pressure, can be reached to change or modify the motor displacement. An example of this is shown in FIG. 4.

Figure 4:
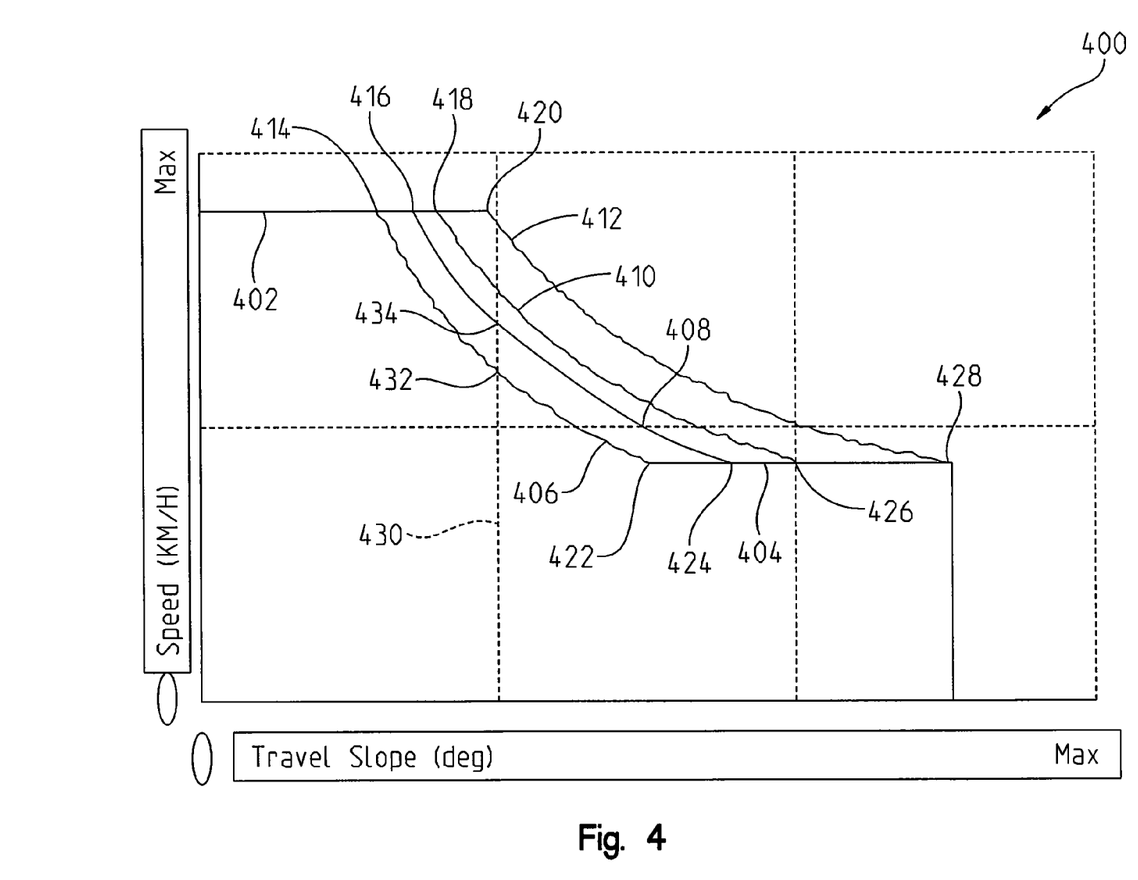
FIG. 4 is a graphical view of different motor displacement profiles during machine operation.

Referring to FIG. 4, a graphical illustration 400 of a plurality of motor displacement profiles are shown plotted as a function of travel slope and machine speed. As shown, on the far left portion of the graph is minimum displacement 402 and maximum speed of the machine, whereas on the far right portion of the graph is maximum displacement 404 and minimum speed of the machine. As described, the motor control can be set so that the motor operates at or near minimum displacement so that the machine can travel at high speed. The start of control pressure or threshold at which the motor displacement begins to vary, however, is mechanically set (or fixed).

In FIG. 4, for example, a first profile 406 can have a first start of control pressure or threshold 414. As the machine travels along an increased slope, the load on the tracks increases thereby inducing a greater load pressure on the motor. Once the load pressure reaches the first start of control pressure or threshold 414, the motor control begins to swivel the motor from minimum displacement to increase torque to ascend the slope albeit at a reduced machine speed. Motor displacement continues to vary until it reaches maximum displacement 422 along the first profile 406. As noted, this corresponds to the minimum speed of the machine.

The same can be held for a second profile 408 having a second start of control pressure 416 or threshold, a third profile 410 having a third start of control pressure 418 or threshold, and a fourth profile 412 having a fourth start of control pressure 420 or threshold. With respect to the second profile 408, for example, the motor operates at minimum displacement until the load pressure overcomes the start of control pressure 416 point on the profile and then the motor displacement begins to vary between minimum displacement 402 and maximum displacement 404. The motor reaches maximum displacement at point 424 along the second profile 408. Likewise, the motor reaches maximum displacement at point 426 along the third profile 410 and at point 428 along the fourth profile 412. At each of points 424, 426, and 428, the machine is operating at its minimum speed.

As shown in FIG. 4, the first profile 406 reaches its start of control pressure 414 at a smaller slope compared to the second profile 408, third profile 410, and fourth profile 412. Moreover, the first profile 406 also reaches maximum displacement 422, and hence minimum machine speed, at a smaller slope than the second profile 408, third profile 410, and fourth profile 412.

A given slope is defined by vertical line 430 in FIG. 4. As shown, the first profile 406 crosses the vertical line 430 and reaches the defined slope at point 432. The second profile 408 crosses the vertical line 430 and reaches the defined slope at point 434. Here, if a motor is operating in accordance with the first displacement profile 406, the machine will be travelling at a slower speed at the defined slope compared to the instance in which the motor operates in accordance with the second displacement profile 408. Although individual points are not specifically labelled in FIG. 4, it is shown that a motor operating in accordance with the third displacement profile 410 and fourth displacement profile 412 will allow the machine to travel at higher speeds than if the motor were operating according to the first or second profiles. Hence, if a machine operator desires to travel at the highest speed possible, it is desirable for the motor to operate in accordance with the third or fourth displacement profiles. Moreover, to do so, the start of control pressure must be set in accordance with either profile.

As the machine ascends the slope, i.e., slope increases, additional torque is required to drive the tracks along the ground and move the machine up the slope. To operate the hydraulic motors and operably drive the tracks, hydraulic pressure is supplied to the motor. With the machine have multi-functionality (e.g., boom control, swing control, work implement control, etc.), and at least one function requiring hydraulic fluid from the pump, it is desired to maintain a substantially constant difference of pressure over the hydraulic motor so that the machine can maintain its multi-functionality. To maintain a substantially constant difference of pressure, however, the motor displacement increases thereby causing machine speed to be reduced as its torque is increased.

For travel purposes, and as previously described, operating along the fourth profile 412 is optimal because the machine can achieve the highest speed for a given slope. This, however, may not be optimal for a machine to achieve multiple functions because the tracks require the greatest amount of power from the engine and hydraulic pump, thereby reducing or preventing the use of other machine functions. Similarly and as previously described, operating along the first profile 406 may allow for additional machine functionality, but the machine operates at the slowest speed for a given slope. Therefore, in many conventional applications, the motor start of control pressure is mechanically fixed to one of the profiles between the first profile 406 and fourth profile 412. With it being mechanically fixed, however, it is difficult to change or modify the start of control pressure of the motor in most conventional applications.

To further describe this aspect, in one non-limiting embodiment each hydraulic motor of the machine can be set to operate along the second profile 408. Here, the profile 408 has a start of control pressure 416 and a maximum displacement point 424 at which the machine operates at minimum speed. For purposes of understanding the motor control, the motor can operate at minimum displacement as the machine climbs the slope. However, assuming the machine continues to climb and the load pressure on the motor continues to increase, the start of control pressure is reached at point 416 in FIG. 4. In other words, the load pressure hits this start of control pressure threshold 416 and motor displacement begins to be regulated.

The motor control continues to regulate motor displacement as the machine climbs the slope until maximum displacement is reached at point 424. Once point 424 is reached, the machine can continue to climb but at its slowest speed. The machine can continue to climb until another threshold point is reached at which the motor may require additional fluid pressure to move any further. In some instances, i.e., when higher machine speed is desired, it may be more beneficial to operate at a different profile. However, as previously described, it can be difficult to adjust this mechanical setting on the motor. For example, a technician may have to remove various covers and access the top portion of the machine to make any adjustment. Therefore, the mechanical setting on the machine (i.e., to follow the second profile 408 of FIG. 4) can be set at a desired profile having a fixed start of control pressure so that hydraulic pressures for other functions are not affected by machine operation.

The present disclosure, however, provides an alternative embodiment or aspect to the control scheme previously described. More specifically, the present disclosure provides a means for adjusting the start of control pressure or threshold in real-time so that optimal machine performance can be achieved. Whereas in conventional applications this setting is fixed and is difficult to change, the embodiments of the present disclosure can continuously vary or adjust the start of control pressure so that the machine can operate at higher speeds when desired and achieve greater machine functionality when desired.

Figure 3:
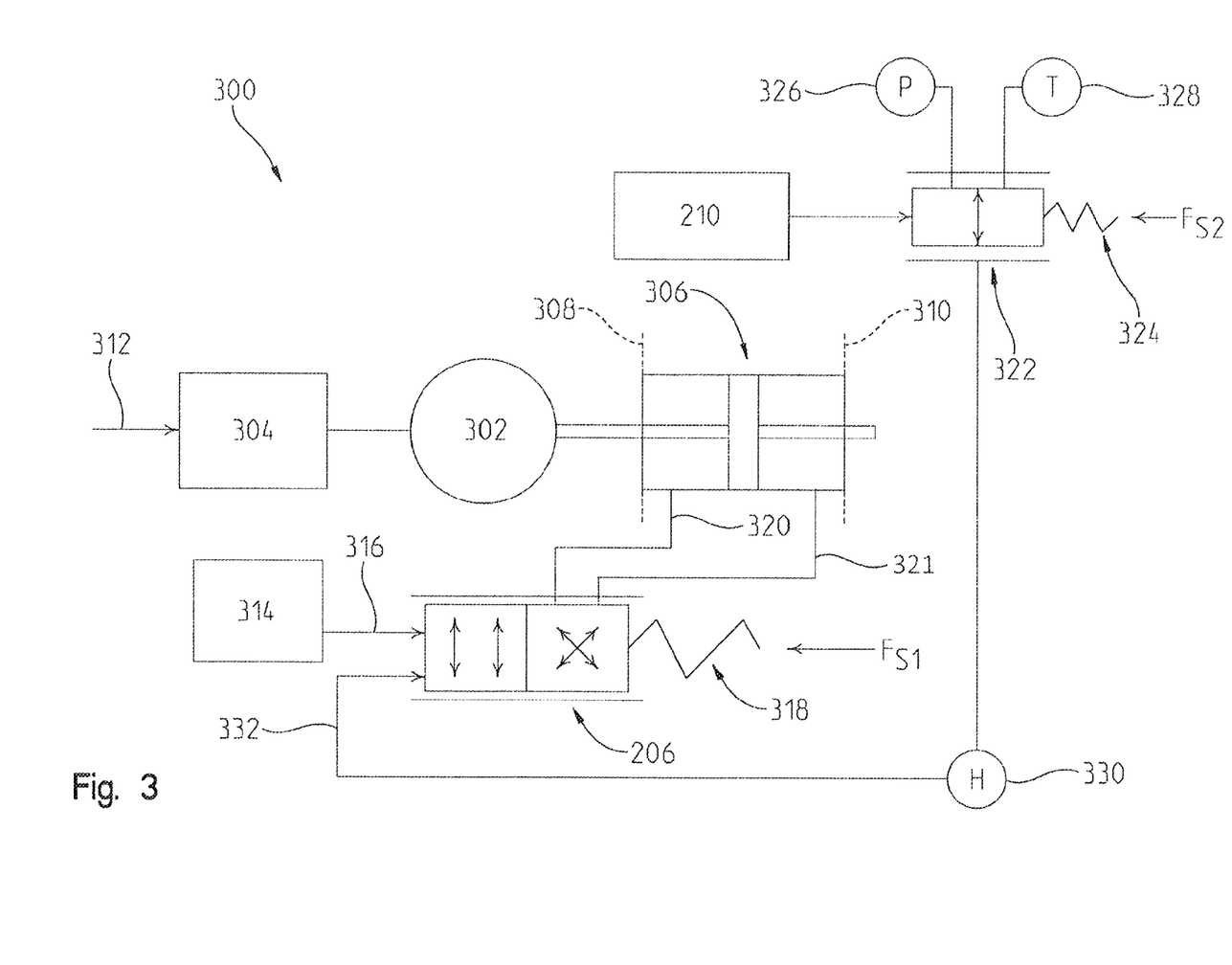
FIG. 3 is another control schematic for controlling a hydraulic motor displacement.

Referring to FIGS. 2 and 3, a control system 300 is shown for controlling the start of control pressure of a variable displacement hydraulic motor 302. The motor 302 can be the same as the first hydraulic drive motor 214 and the second hydraulic drive motor 216 of FIG. 2. The motor 302 can transfer output torque to a gearbox 304 for driving a machine forward and backward. The gearbox 304 in FIG. 3 can be similar to the first gearbox 218 and second gearbox 224 of FIG. 2. During machine travel, the motor 302 can operate at minimum displacement. As the machine encounters a slope, stump, difficult terrain, etc., a load 312 can be applied to the gearbox 304 which in turn is received by the motor 302. In response to the load 312, a motor load pressure signal 314 can be transferred from the motor (e.g., one of two fluid ports on the motor) to a control or servo valve 206 in the form of a pressure load or force 316. The control or servo valve 206 can be internal to the motor 302, or in other embodiments it can be disposed entirely or partially outside of the motor 302. The motor load pressure signal 314 can be the pressure at which the motor works, and this pressure varies based on different loads transferred to the motor 302.

The control valve 206 is in communication with the motor 302, as described with reference to FIG. 2. Moreover, the control valve 206 can be fluidly coupled to the motor 302 and transfer fluid to an actuator 306 internally disposed within the motor 302. The actuator 306 can be in the form of a piston that is movably disposed within a cylinder. The cylinder can have a first end 308 and a second end 310, where the piston moves therebetween. When the piston is disposed at the first end 308, the motor is configured at minimum displacement. When the piston is disposed at the second end 310, the motor is configured at maximum displacement. To regulate the actuator 306 between minimum displacement and maximum displacement, the control valve 206 can transfer fluid through a first flow path 320 and a second flow path 321. In the arrangement shown in FIG. 3, fluid can pass through the first flow path 320 and fill the cylinder to urge the piston towards the second end 310 (i.e., towards maximum displacement). Alternatively, fluid can flow through the second flow path 321 and fill the cylinder to urge the piston towards the first end 308 (i.e., towards minimum displacement).

The manner in which the control valve 206 hydraulically controls the actuator 306, and thereby regulates the displacement of the motor 302, is further shown in FIG. 3. Here, a spring 318 having a fixed spring constant is disposed in contact with one side of the control valve 206. In this manner, the spring 318 can exert a spring force, $F_{S1}$, against the control valve 206. The spring force, $F_{S1}$, can be opposed by the motor load pressure signal 314 which exerts a force 316 against a second side of the control valve 206. The first side and second side of the control valve 206 can be defined as opposite sides of the valve. When the spring force, $F_{S1}$, is greater than the motor load pressure signal force 316, the motor 302 can be disposed at minimum displacement. However, as the load pressure signal force 316 overcomes or exceeds the spring force, $F_{S1}$, the control valve 206 can vary the motor displacement. Here, the start of control point can be defined at the point in which the spring force, $F_{S1}$, is overcome by the motor load pressure signal force 316. Thus, motor displacement can be controlled according to the type of spring and its corresponding spring force.

The motor 302 can also include an external port 330 (port H) that is fluidly coupled to a hydraulic tank in most applications, and therefore no fluid pressure is received at this port 330. However, in FIG. 3, the external port 330 can be fluidly coupled to a proportional reducing relieving valve 322, or the PRV valve. The PRV valve 322 can be fluidly coupled to both a fluid source 326 (e.g., pressure source "P") and tank pressure 328 (e.g., tank "T"). In this disclosure, the PRV valve 322 can also be referred to as an electro-hydraulic valve similar to that of the valve 212 in FIG. 2. The fluid source 326 can provide a constant pressure signal from another portion of the hydraulic system of the machine. The PRV valve 322 can be mechanically disposed or biased in a closed position by a spring 324 that exerts a spring force, $F_{S2}$, against the valve 322. In this case, the spring 324 substantially prevents or blocks the PRV valve 322 from fluidly coupling the fluid source 326 and external port 330 to one another.

The PRV valve 322 can also be disposed in electrical communication with the machine controller 210. The machine controller 210 can send an electrical signal (e.g., current) to induce a force against the PRV valve 322, thereby causing the PRV valve 322 to at least partially open and releasing fluid to the external port 330. In turn, the fluid can pass through the external port 330 and be directed to the control valve 206 along flow path 332. As such, the control valve 206 is fluidly coupled to the external port 330 and the PRV valve 322. The fluid pressure passing through flow path 332 can exert a force against the control valve 206 in the same direction as the motor load pressure signal force 316. As such, two pressure signals exert a combined force against the control valve 206, which is opposed by the fixed spring force, $F_{S1}$, as described above. In this manner, the equilibrium set between the spring force, $F_{S1}$, and the motor load pressure signal 314 can be overridden or varied by fluid pressure from the PRV valve 322. This, in turn, can require a lower pressure from the motor load pressure signal 314 to cause the control valve 206 to vary or regulate the start of control pressure of the motor.

As previously described, movement of the control valve 206 can hydraulically induce movement of the actuator 306 to thereby vary motor displacement between its minimum and maximum. In effect, this can modify or controllably adjust the speed and torque capability of the motor. Moreover, the machine can be more adaptable under different and varying operating conditions. In other words, the control system of the machine can induce a proportional, hydraulic load via the controller 210 and the PRV valve 322 so that the equilibrium or start of control pressure threshold can be varied to more easily override or offset the fixed spring force.

In a related aspect, the controller 210 can be in electrical communication with the operator controls 208 of the machine. Thus, as an operator manipulates a joystick, lever, or other control button to operably control the machine, the controller 210 can interpret this input from the operator and respond accordingly. Moreover, this response from the controller 210 can be in the form of varying the start of control pressure of the motor (i.e., by communicating a control signal to the PRV valve 322 to vary the amount of fluid pressure transferred from the fluid source 326 to the control valve 206 via flow path 332).

Figure 5:
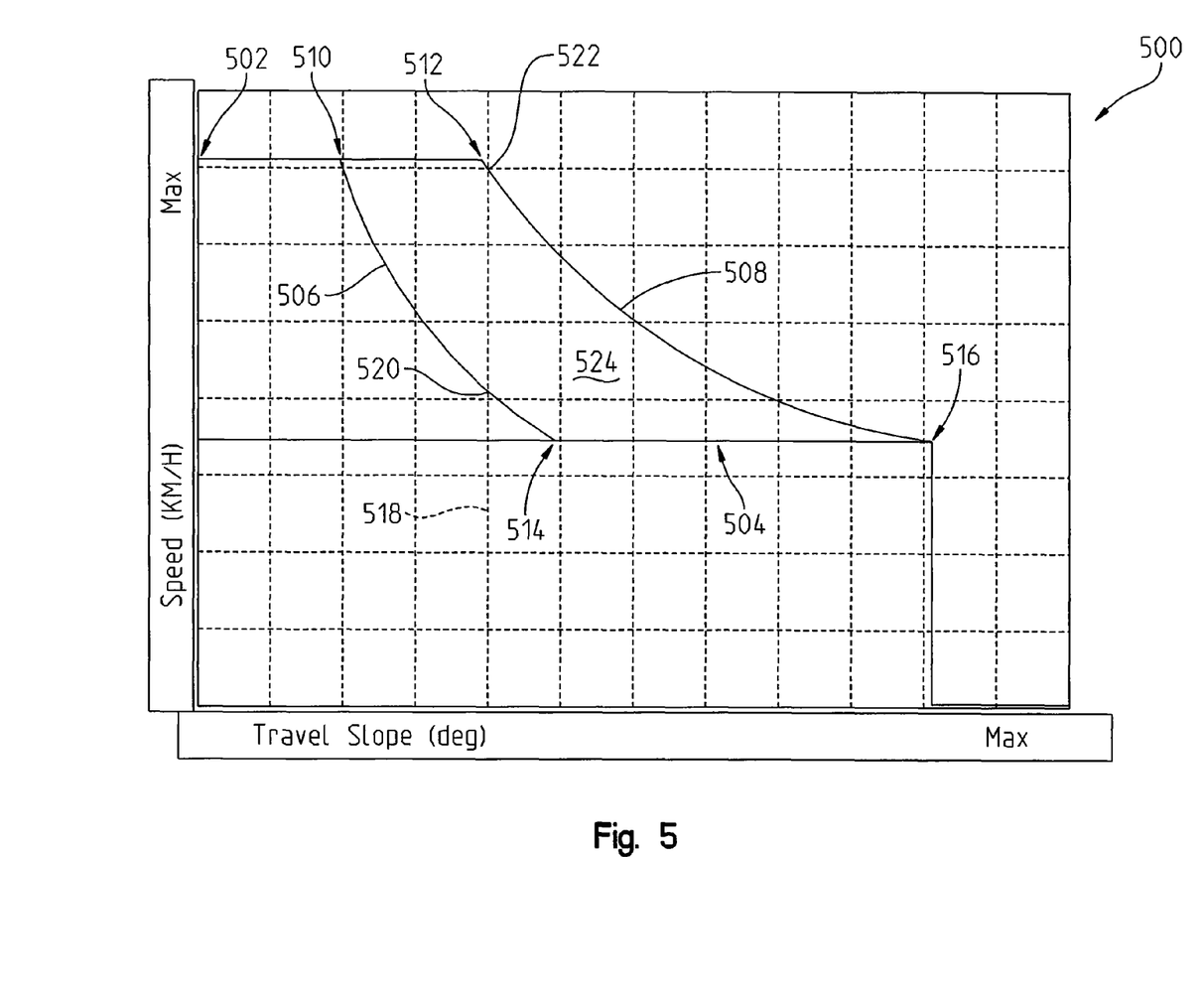
FIG. 5 is a graphical representation of continuously adjustably controlling motor displacement during machine operation.

Referring to FIG. 5, a different graphical representation 500 is shown which characterizes how continuously varying start of control pressure can affect motor displacement as a function of travel slope and machine speed. Here, the hydraulic motor can operate at a predetermined minimum displacement 502 as the machine begins to ascend a slope. As previously described, the predetermined minimum displacement 502 may correspond to the motor's actual minimum displacement setting, or alternatively it may correspond to a setting that is defined by an operator which is greater than the motor's actual minimum displacement. The motor can also operate at maximum displacement 504 as shown in FIG. 5. At minimum motor displacement 502, the machine can operate at or near a maximum speed, whereas at maximum motor displacement 504 the machine tends to operate at its slowest speed.

In FIG. 5, the graphical representation 500 includes a first motor displacement profile 506 and a second motor displacement profile 508 that is disposed offset to the right of the first profile 506. A motor that operates according to the first profile 506 is one in which the machine can travel at slow speeds at a given slope but achieve high multi-functionality, whereas the second profile 508 represents a profile upon which the machine can travel at higher speeds for a given slope but with limited multi-functionality capabilities.

The first profile 506 includes a first start of control pressure 510 and a first maximum displacement point 514. Likewise, the second profile 508 includes a second start of control pressure 512 and a second maximum displacement point 516, both of which are disposed to the right of the first start of control pressure 510 and first maximum displacement point 514. In addition, a given slope is identified by a vertical line 518 in FIG. 5. The first profile 506 crosses this given slope 518 at a first point 520. The second profile 508 crosses this given slope 518 at a second point 522. As shown, the machine operates at a slower speed for the given slope 518 if the motor operates according to the first profile 506, whereas the machine operates at a greater speed if the motor operates according to the second profile 508 (i.e., point 520 of the first profile 506 corresponds to a slower speed than point 522 of the second profile 508).

In accordance with the present disclosure, the additional variable override signal (i.e., pilot signal) provided by the PRV or electro-hydraulic valve 322 allows the controller 210 to continuously operate in real-time in a variable start of control region 524. The variable start of control region 524 is defined between the first profile 506 and the second profile 508 of FIG. 5 based on desired machine functionality. In other words, the controller 210 can continuously adjust or vary the start of control pressure based on a desired need so that the motor can operate within the defined region 524. For instance, if the machine operator wants to operate at a higher speed and the controller 210 interprets this desire via the operator controls 208, the controller can send an electrical signal to the PRV valve 322 to induce a pressure load to the control valve 206 to vary or offset the start of control pressure of the motor towards the second start of control pressure 512, thereby allowing the machine to operate at or near its maximum speed as it continues to ascend a slope. In other words, the motor may operate within the region 524 in a manner corresponding to the second profile 512 of FIG. 5.

If the operator desires to cut down a tree or needs greater functionality from the machine, the controller can receive this input from the operator controls 208 and induce a similar signal to the PRV valve 322. Here, the motor may operate within the region 524 closer to the first profile 506. Based on the control and functionality desired from the machine, the controller 210 can continuously vary the pressure signal sent to the control valve 206, which in turn can override or adjust the start of control pressure of the motor as necessary.

Various embodiments of the present disclosure allows for the implementation of a variable start of control for the variable displacement hydraulic motors used for the track system on a forestry machine. This can provide for better machine performance under different terrain and machine operations, and the machine is better able to adapt to changing conditions in the terrain and machine functionality. Moreover, the control system of the machine is better able to increase machine productivity, meet operator demands, optimize fuel consumption, and reduce operator fatigue by adapting the track characteristics to the machine working cycle.

While exemplary embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A control system of a powered machine, the machine having an engine for producing power and a track system for moving along a surface, comprising:
   a hydraulic pump adapted to provide fluid pressure to the control system;
   a hydraulic motor configured to drive the track system, the motor being operable with a variable displacement between a minimum displacement and a maximum displacement;
   a control valve fluidly coupled to the motor along a pressure load line, where a load input received by the motor during operation transfers a load pressure from the motor to the control valve via the pressure load line;
   a controller; and
   a proportional electro-hydraulic valve disposed in electrical communication with the controller and fluid communication with the control valve, the proportional electro-hydraulic valve being operably controlled by the controller between a closed position and any one of a plurality of open positions to vary fluid pressure from the proportional electro-hydraulic valve to the control valve;
   wherein, the motor is operably controlled in a start of control pressure region defined by a first profile curve and a second profile curve, the first profile curve defined relative to travel slope and machine speed and including a first start of control pressure point and a first maximum displacement point, and the second profile curve defined relative to travel slope and machine speed and including a second start of control pressure point and a second maximum displacement point;
   wherein, a movement of the proportional electro-hydraulic valve induces a movement of the control valve to variably control motor operation at any location within the start of control pressure region;
   further wherein, the machine is operable at a first speed corresponding to the first and second start of control pressure points, and at a second speed corresponding to the first and second maximum displacement points, where the first speed is greater than the second speed.

2. The control system of claim 1, wherein the pump is fluidly coupled to the control valve when the proportional electro-hydraulic valve is disposed in at least one of its plurality of open positions.

3. The control system of claim 1, wherein the proportional electro-hydraulic valve is biased in a closed position.

4. The control system of claim 1, further comprising a spring for biasing the control valve to a first position, where in the first position the control valve fluidly controls the motor to minimum displacement.

5. The control system of claim 4, wherein the proportional electro-hydraulic valve sends a fluid pressure to the control valve, the fluid pressure and load pressure induce a pressure force against the control valve to vary the start of control pressure of the motor between its first start of control pressure and second start of control pressure.

6. The control system of claim 4, further comprising a motor actuator fluidly coupled to the control valve, where a movement of the control valve induces a corresponding movement of the motor actuator to vary the start of control pressure and displacement of the motor.

7. A method for varying the start of control pressure of a variable displacement hydraulic motor adapted to drive a track system of a machine along a ground surface, the machine including user controls for controlling the functionality of the machine, a controller in electrical communication with the user controls, a control valve biased in a first position by a spring having a fixed spring force, and a proportional electro-hydraulic valve electrically coupled to the controller and fluidly coupled to the control valve, the method comprising:
   sending an electrical signal to the proportional electro-hydraulic valve;
   moving the proportional electro-hydraulic valve from a substantially closed position to any one of a plurality of open positions;
   fluidly coupling the proportional electro-hydraulic valve and control valve to one another;
   controllably moving the control valve from the first position to any one of a plurality of control positions; and
   varying the start of control pressure of the motor with the proportional electro-hydraulic valve between a first start of control pressure and a second start of control pressure, the first and second start of control pressures triggered at approximately the same motor displacement and machine travel speed but at different surface grades, where the first start of control pressure is triggered at a smaller surface grade than the second start of control pressure.

8. The method of claim 7, wherein the varying step comprises fluidly controlling a motor actuator.

9. The method of claim 7, further comprising:
   receiving an input from the user controls, the input related to a desired function of the machine; and
   operably controlling the control valve based on the input by varying fluid pressure provided to the control valve through the proportional electro-hydraulic valve.

10. The method of claim 7, wherein the controllably moving step comprises:
    applying a hydraulic force to the control valve, the hydraulic force including a fluid pressure from the proportional electro-hydraulic valve and a load pressure from the motor;
    compressing the spring; and
    moving the control valve to induce a change in motor displacement.

11. The method of claim 7, further comprising:
    providing the motor with a fixed setting for controlling motor displacement and a plurality of displacement profiles, each of the displacement profiles including a start of control pressure point and a maximum displacement point, where each start of control pressure point is a function of minimum motor displacement and machine travel, and each maximum displacement point is a function of maximum motor displacement and machine travel;
    controlling the motor according to one of the plurality of displacement profiles;

sending a signal to override the fixed setting of the motor; and variably adjusting the motor to operate according to a second of the plurality of displacement profiles.

12. A method of controlling a variable displacement hydraulic motor for driving a machine, the machine including operator controls for controlling the operation of the machine, a controller in electrical communication with the operator controls, a control valve biased in a first position and disposed in fluid communication with the motor, a pump, and a proportional electro-hydraulic valve electrically coupled to the controller and fluidly coupled to the control valve, the method comprising:

receiving an input signal from the operator controls, where the input signal corresponds to a desired machine operation;

sending an electrical signal to the proportional electro-hydraulic valve based on the input signal;

moving the proportional electro-hydraulic valve between a substantially closed position and any one of a plurality of open positions;

fluidly coupling the pump, the proportional electro-hydraulic valve and the control valve to one another when the proportional electro-hydraulic valve is disposed in any one of its plurality of open positions;

controllably moving the control valve from the first position to a second position based on the electrical signal;

controlling the motor within a start of control pressure region based on the desired machine operation, wherein the start of control pressure region is defined by a first profile curve, a second profile curve, a minimum motor displacement, and a maximum motor displacement, the first profile curve including a first start of control pressure point and a first maximum displacement point, and the second profile curve including a second start of control pressure point and a second maximum displacement point; and operating the machine at a first speed corresponding to the first and second start of control pressure points at the minimum motor displacement, and at a second speed corresponding to the first and second maximum displacement points at the motor maximum displacement, where the first speed is greater than the second speed.

13. The method of claim 12, further comprising variably controlling minimum motor displacement at any point in the start of control pressure region between the first start of control pressure point and the second start of control pressure point.

14. The method of claim 12, further comprising variably controlling movement of the proportional electro-hydraulic valve to control motor operation at any location within the start of control pressure region.

15. The method of claim 12, further comprising:
detecting the input signal as a command for an increase in machine speed;
controlling movement of the proportional electro-hydraulic valve;
increasing fluid pressure from the pump to the control valve through the proportional electro-hydraulic control valve; and
controllably adjusting motor operation within the start of control pressure region to increase motor displacement.

16. The method of claim 12, further comprising continuously operating the motor at minimum displacement between the first start of control pressure point and the second start of control pressure point.

17. The method of claim 12, further comprising:
controlling movement of the proportional electro-hydraulic control valve to reduce fluid pressure to the control valve;
increasing motor displacement; and
reducing a travel speed of the machine.

18. The method of claim 12, further comprising:
receiving a load input by the motor during machine operation;
transferring a load pressure from the motor to the control valve via a pressure load line; and
controlling movement of the proportional electro-hydraulic valve between its closed position and any one of its plurality of open positions to vary fluid pressure from the proportional electro-hydraulic valve to the control valve in response to the load pressure.

19. The control system of claim 1, wherein the first and second start of control pressure points define a minimum motor displacement as a function of travel slope.

20. The control system of claim 1, wherein the motor is maintained at its minimum motor displacement between the first start of control pressure point and the second start of control pressure point.

* * * * *